(12) United States Patent
Tarraf et al.

(10) Patent No.: US 9,008,722 B2
(45) Date of Patent: Apr. 14, 2015

(54) METHODS AND APPARATUS FOR COORDINATION IN MULTI-MODE NETWORKS

(71) Applicant: Reverb Networks, Inc., Sterling, VA (US)

(72) Inventors: Osama Tarraf, Ashburn, VA (US); Arif Ansari, Bethesda, MD (US)

(73) Assignee: Reverb Networks, Inc., Sterling, VA (US)

(*) Notice: Subject to any disclaimer, the term of this patent is extended or adjusted under 35 U.S.C. 154(b) by 175 days.

(21) Appl. No.: 13/767,148

(22) Filed: Feb. 14, 2013

(65) Prior Publication Data
US 2013/0217435 A1 Aug. 22, 2013

Related U.S. Application Data

(60) Provisional application No. 61/600,223, filed on Feb. 17, 2012.

(51) Int. Cl.
*H04W 88/06* (2009.01)
*H04W 24/02* (2009.01)

(52) U.S. Cl.
CPC .............. *H04W 88/06* (2013.01); *H04W 24/02* (2013.01)

(58) Field of Classification Search
CPC ..... H04W 24/04; H04W 24/10; H04W 28/00; H04W 88/06; H04W 88/08; H04W 88/12; H04W 24/02
USPC ............... 455/552.1, 522, 62, 418, 423, 13.3, 455/575.7; 370/254, 235, 328, 316, 329, 370/229
See application file for complete search history.

(56) References Cited

U.S. PATENT DOCUMENTS 5,425,051 A 6/1995 Mahany
5,796,722 A 8/1998 Kotzin et al.
(Continued)

FOREIGN PATENT DOCUMENTS

EP 2129175 12/2010
EP 1952657 8/2011
(Continued)

OTHER PUBLICATIONS

International Search Report and Written Opinion mailed Jun. 18, 2010 for PCT Application No. PCT/US2010/31603.
(Continued)

*Primary Examiner* — Tan Trinh
(74) *Attorney, Agent, or Firm* — Cooley LLP

(57) ABSTRACT

A non-transitory processor-readable medium stores code to cause a processor to receive a performance indicator associated with a first mode. The code causes the processor to calculate, using the performance indicator associated with the first mode, a first metric value associated with a first metric and an objective of the first mode. The code causes the processor to calculate, using the first metric value, a second metric value associated with a second metric and an objective of a second mode. The second metric value partially compensates for a change in a performance indicator associated with the second mode when the first metric value is implemented. The code causes the processor to send a signal associated with the first metric value and a signal associated with the second metric value to an antenna module such that the antenna module implements the first metric value and the second metric value.

20 Claims, 8 Drawing Sheets

(56) References Cited

U.S. PATENT DOCUMENTS

| | | |
|---|---|---|
| 5,802,144 A | 9/1998 | Laird et al. |
| 5,859,839 A | 1/1999 | Ahlenius et al. |
| 6,051,408 A | 4/2000 | Bartsch et al. |
| 6,069,871 A | 5/2000 | Sharma et al. |
| 6,115,393 A | 9/2000 | Engel et al. |
| 6,138,016 A | 10/2000 | Kulkarni et al. |
| 6,141,565 A | 10/2000 | Feuerstein et al. |
| 6,253,077 B1 | 6/2001 | Burt et al. |
| 6,304,556 B1 | 10/2001 | Haas |
| 6,400,335 B1 | 6/2002 | Weaver et al. |
| 6,545,690 B1 | 4/2003 | Hernandez |
| 6,549,529 B1 | 4/2003 | Drabeck et al. |
| 6,574,477 B1 | 6/2003 | Rathunde |
| 6,729,929 B1 | 5/2004 | Sayers et al. |
| 6,829,491 B1 | 12/2004 | Yea et al. |
| 6,842,431 B2 | 1/2005 | Clarkson et al. |
| 6,937,863 B1 | 8/2005 | Gordon et al. |
| 6,985,704 B2 | 1/2006 | Yang et al. |
| 6,999,766 B1 | 2/2006 | Padovani |
| 7,006,805 B1 | 2/2006 | Sorrells et al. |
| 7,016,685 B1 | 3/2006 | Cain et al. |
| 7,149,478 B2 | 12/2006 | Hawe |
| 7,260,415 B1 | 8/2007 | Oh |
| 7,323,945 B2 | 1/2008 | Cyr et al. |
| 7,349,765 B2 | 3/2008 | Reaume et al. |
| 7,385,503 B1 | 6/2008 | Wells et al. |
| 7,461,037 B2 | 12/2008 | Hätönen et al. |
| 7,477,920 B2 | 1/2009 | Scheinert et al. |
| 7,505,010 B2 | 3/2009 | Franzon et al. |
| 7,519,860 B2 | 4/2009 | Hätönen et al. |
| 7,529,215 B2 | 5/2009 | Osterling |
| 7,561,876 B2 | 7/2009 | Chiou et al. |
| 7,577,103 B2 | 8/2009 | Diaz et al. |
| 7,590,589 B2 | 9/2009 | Hoffberg |
| 7,606,287 B2 | 10/2009 | Mahany |
| 7,609,747 B2 | 10/2009 | Mahany |
| 7,623,455 B2 | 11/2009 | Hilla et al. |
| 7,653,407 B2 | 1/2010 | Backes et al. |
| 7,663,555 B2 | 2/2010 | Caimi et al. |
| 7,747,712 B2 | 6/2010 | Petersen et al. |
| 7,768,968 B2 | 8/2010 | Plehn et al. |
| 7,827,268 B2 | 11/2010 | Monier et al. |
| 7,839,882 B2 | 11/2010 | Soliman |
| 7,877,095 B2 | 1/2011 | Hubner et al. |
| 7,877,108 B2 | 1/2011 | Wengerter et al. |
| 7,899,890 B2 | 3/2011 | Petersen et al. |
| 7,904,080 B2 | 3/2011 | Atkins et al. |
| 7,941,136 B2 | 5/2011 | Reed et al. |
| 7,969,896 B2 | 6/2011 | Sheinfeld et al. |
| 8,010,469 B2 | 8/2011 | Kapoor et al. |
| 8,018,925 B2 | 9/2011 | Noriega |
| 8,023,529 B2 | 9/2011 | Oh et al. |
| 8,032,131 B2 | 10/2011 | Dobson et al. |
| 8,050,191 B2 | 11/2011 | Tirpak et al. |
| 8,117,294 B2 | 2/2012 | Pollakowski et al. |
| 8,144,619 B2 | 3/2012 | Hoffberg |
| 8,159,932 B1 * | 4/2012 | Hart et al. .................. 370/208 |
| 8,185,124 B2 | 5/2012 | Antic et al. |
| 8,208,924 B2 | 6/2012 | Han et al. |
| 8,295,877 B2 | 10/2012 | Hui et al. |
| 8,320,850 B1 | 11/2012 | Khlat |
| 8,355,728 B2 | 1/2013 | Jung et al. |
| 8,665,835 B2 | 3/2014 | Hussein et al. |
| 2002/0056066 A1 | 5/2002 | Gesbert et al. |
| 2003/0100344 A1 | 5/2003 | Garmonov et al. |
| 2003/0191856 A1 | 10/2003 | Lewis et al. |
| 2003/0228857 A1 | 12/2003 | Maeki |
| 2003/0229478 A1 | 12/2003 | Rappaport et al. |
| 2004/0018839 A1 | 1/2004 | Andric et al. |
| 2004/0042473 A1 * | 3/2004 | Park et al. .................. 370/408 |
| 2004/0117226 A1 | 6/2004 | Laiho et al. |
| 2004/0196834 A1 | 10/2004 | Ofek et al. |
| 2004/0229621 A1 | 11/2004 | Misra |
| 2004/0266442 A1 | 12/2004 | Flanagan et al. |
| 2005/0009531 A1 | 1/2005 | Lindquist et al. |
| 2005/0176440 A1 | 8/2005 | Sang et al. |
| 2005/0243723 A1 | 11/2005 | Randriamasy |
| 2005/0259571 A1 | 11/2005 | Battou |
| 2005/0277444 A1 | 12/2005 | Rensburg et al. |
| 2006/0083170 A1 | 4/2006 | Silva et al. |
| 2006/0221886 A1 | 10/2006 | Rao |
| 2006/0239224 A1 | 10/2006 | Borst et al. |
| 2006/0246844 A1 | 11/2006 | Kroboth et al. |
| 2007/0002765 A1 | 1/2007 | Kadaba et al. |
| 2007/0021151 A1 | 1/2007 | Mori et al. |
| 2007/0066298 A1 | 3/2007 | Hurst |
| 2007/0087756 A1 | 4/2007 | Hoffberg |
| 2007/0094729 A1 | 4/2007 | Hoefelmeyer et al. |
| 2007/0147297 A1 | 6/2007 | Diaz et al. |
| 2007/0195721 A1 | 8/2007 | Backes et al. |
| 2007/0218862 A1 | 9/2007 | Tatman et al. |
| 2007/0248039 A1 | 10/2007 | Backes et al. |
| 2008/0004078 A1 | 1/2008 | Barratt et al. |
| 2008/0016198 A1 | 1/2008 | Johnston-Watt et al. |
| 2008/0020801 A1 | 1/2008 | Fesas et al. |
| 2008/0039089 A1 | 2/2008 | Berkman et al. |
| 2008/0207195 A1 | 8/2008 | Ranta et al. |
| 2008/0225714 A1 | 9/2008 | Denis |
| 2008/0268833 A1 | 10/2008 | Huang et al. |
| 2008/0311924 A1 | 12/2008 | Lucidarme |
| 2009/0003236 A1 | 1/2009 | Aoyama et al. |
| 2009/0023477 A1 | 1/2009 | Staudte |
| 2009/0036116 A1 | 2/2009 | Kim et al. |
| 2009/0047968 A1 | 2/2009 | Gunnarsson et al. |
| 2009/0075648 A1 | 3/2009 | Reed et al. |
| 2009/0075655 A1 | 3/2009 | Dobson et al. |
| 2009/0112932 A1 | 4/2009 | Skierkowski et al. |
| 2009/0131038 A1 | 5/2009 | MacNaughtan et al. |
| 2009/0163223 A1 | 6/2009 | Casey |
| 2009/0221297 A1 | 9/2009 | Wengerter et al. |
| 2009/0227261 A1 | 9/2009 | Tiirola et al. |
| 2009/0257353 A1 | 10/2009 | Song et al. |
| 2009/0264130 A1 | 10/2009 | Catovic et al. |
| 2009/0312022 A1 | 12/2009 | Viorel et al. |
| 2009/0315736 A1 | 12/2009 | Reichl et al. |
| 2009/0323530 A1 | 12/2009 | Trigui et al. |
| 2010/0008293 A1 | 1/2010 | Gupta et al. |
| 2010/0046369 A1 | 2/2010 | Zhao et al. |
| 2010/0075682 A1 | 3/2010 | del Rio-Romero |
| 2010/0103911 A1 | 4/2010 | Ji |
| 2010/0111013 A1 | 5/2010 | Chou |
| 2010/0111047 A1 | 5/2010 | Yang et al. |
| 2010/0124934 A1 | 5/2010 | Mach |
| 2010/0130194 A1 | 5/2010 | Dickey |
| 2010/0149984 A1 | 6/2010 | Kapoor et al. |
| 2010/0159936 A1 | 6/2010 | Brisebois et al. |
| 2010/0190488 A1 | 7/2010 | Jung et al. |
| 2010/0203881 A1 | 8/2010 | Del Rio Romero et al. |
| 2010/0214939 A1 | 8/2010 | Ryan |
| 2010/0216453 A1 | 8/2010 | Kallin et al. |
| 2010/0216467 A1 | 8/2010 | Ryan et al. |
| 2010/0216477 A1 | 8/2010 | Ryan |
| 2010/0232318 A1 | 9/2010 | Sarkar |
| 2010/0235285 A1 | 9/2010 | Hoffberg |
| 2010/0254344 A1 | 10/2010 | Wei et al. |
| 2010/0278161 A1 | 11/2010 | Ore et al. |
| 2010/0284303 A1 | 11/2010 | Catovic et al. |
| 2010/0299419 A1 | 11/2010 | Ramankutty et al. |
| 2010/0303174 A1 * | 12/2010 | Oh et al. .................. 375/329 |
| 2010/0311415 A1 | 12/2010 | Hamabe et al. |
| 2010/0311421 A1 | 12/2010 | Mach |
| 2010/0325267 A1 | 12/2010 | Mishra et al. |
| 2011/0009105 A1 | 1/2011 | Lee et al. |
| 2011/0014925 A1 | 1/2011 | Antic et al. |
| 2011/0028144 A1 | 2/2011 | Catovic et al. |
| 2011/0044165 A1 | 2/2011 | Ni et al. |
| 2011/0045865 A1 | 2/2011 | Viering et al. |
| 2011/0059744 A1 | 3/2011 | Won et al. |
| 2011/0090820 A1 | 4/2011 | Hussein et al. |
| 2011/0092195 A1 | 4/2011 | Hussein et al. |
| 2011/0096687 A1 | 4/2011 | Dottling et al. |
| 2011/0096688 A1 | 4/2011 | Sachs et al. |
| 2011/0105139 A1 | 5/2011 | On |
| 2011/0111700 A1 | 5/2011 | Hackett |

(56) References Cited

U.S. PATENT DOCUMENTS

| | | | |
|---|---|---|---|
| 2011/0130135 | A1 | 6/2011 | Trigui |
| 2011/0136478 | A1 | 6/2011 | Trigui |
| 2011/0141972 | A1 | 6/2011 | Oh et al. |
| 2011/0151881 | A1 | 6/2011 | Chou et al. |
| 2011/0190016 | A1 | 8/2011 | Hamabe et al. |
| 2011/0199985 | A1 | 8/2011 | Cai et al. |
| 2011/0230222 | A1 | 9/2011 | Reudink |
| 2011/0252477 | A1 | 10/2011 | Sridhar et al. |
| 2011/0280157 | A1 | 11/2011 | Suerbaum |
| 2011/0294527 | A1 | 12/2011 | Brueck et al. |
| 2012/0009912 | A1 | 1/2012 | Wang et al. |
| 2012/0026918 | A1 | 2/2012 | Won et al. |
| 2012/0026941 | A1 | 2/2012 | Ahmad et al. |
| 2012/0028584 | A1 | 2/2012 | Zhang et al. |
| 2012/0028664 | A1 | 2/2012 | Zhang et al. |
| 2012/0034919 | A1 | 2/2012 | Nakata et al. |
| 2012/0066377 | A1 | 3/2012 | Li et al. |
| 2012/0087257 | A1 | 4/2012 | Larsson et al. |
| 2012/0087269 | A1 | 4/2012 | Hussein et al. |
| 2012/0147765 | A1 | 6/2012 | Wigren |
| 2012/0147828 | A1 | 6/2012 | Wigren |
| 2012/0170478 | A1 | 7/2012 | Doettling et al. |
| 2012/0182874 | A1 | 7/2012 | Siomina et al. |
| 2012/0252479 | A1 | 10/2012 | Morita et al. |
| 2012/0264470 | A1 | 10/2012 | Bajj et al. |
| 2012/0270536 | A1 | 10/2012 | Ratasuk et al. |
| 2012/0295609 | A1 | 11/2012 | Li et al. |
| 2012/0327797 | A1 | 12/2012 | Siomina et al. |
| 2013/0028107 | A1 | 1/2013 | Ho et al. |
| 2013/0114464 | A1* | 5/2013 | Tarraf et al. .................. 370/254 |
| 2013/0229914 | A1* | 9/2013 | Suerbaum ..................... 370/229 |
| 2013/0242736 | A1* | 9/2013 | Tarraf et al. .................. 370/235 |
| 2013/0322395 | A1* | 12/2013 | Kazmi et al. ................. 370/329 |

FOREIGN PATENT DOCUMENTS

| | | |
|---|---|---|
| WO | WO 2007/063426 A2 | 6/2007 |
| WO | WO-2012/072445 | 6/2012 |

OTHER PUBLICATIONS

U.S. Office Action mailed Oct. 13, 2010 for U.S. Appl. No. 12/385,752, filed Apr. 17, 2009.
U.S. Office Action mailed May 5, 2011 for U.S. Appl. No. 12/385,752, filed Apr. 17, 2009.
International Search Report and Written Opinion mailed Nov. 24, 2010 for PCT Application No. PCT/US2010/050627.
International Search Report and Written Opinion mailed Nov. 15, 2010 for PCT Application No. PCT/US2010/048929.
U.S. Office Action mailed Dec. 22, 2011 for U.S. Appl. No. 12/718,189, filed Mar. 5, 2010.
U.S. Office Action mailed Dec. 29, 2011 for U.S. Appl. No. 12/634,057, filed Dec. 9, 2009.
International Search Report and Written Opinion mailed Nov. 3, 2010 for PCT Application No. PCT/US2010/048927.
Amirijoo et al., "Cell Outage Management in LTE Networks," COST 2100 TD(9)941, Vienna, Austria, Sep. 28-30, 2009.
Mueller et al., "A Cell Outage Detection Algorithm Using Neighbor Cell List Reports" 2008.
U.S. Office Action mailed Feb. 27, 2012 for U.S. Appl. No. 12/385,752, filed Apr. 17, 2009.
U.S. Office Action mailed Jun. 6, 2012 for U.S. Appl. No. 12/634,057, filed Dec. 9, 2009.
U.S. Final Office Action mailed Jul. 13, 2012 for U.S. Appl. No. 12/385,752, filed Apr. 17, 2009.
U.S. Final Office Action mailed Aug. 29, 2012 for U.S. Appl. No. 12/718,189, filed Mar. 5, 2010.
International Search Report and Written Opinion mailed Nov. 5, 2012 for PCT Application No. PCT/US2012/054204.
"Self-Optimizing Networks: The Benefits of SON in LTE," 4G americas, Jul. 2011.
International Search Report and Written Opinion mailed Feb. 5, 2013 for PCT Application No. PCT/US2012/064131.
U.S. Office Action mailed Mar. 18, 2013 for U.S. Appl. No. 12/580,604, filed Oct. 16, 2009.
Lehtimaki et al., "A SOM Based Approach for Visualization of GSM Network Performance Data," Helsinki University of Technology, 2005.
Blume et al., "Energy Savings in Mobile Networks Based on Adaptation to Traffic Statistics," Bell Labs Technical Journal 15(2), 77-94 © 2010 Alcatel-Lucent.
International Search Report and Written Opinion mailed Apr. 29, 2013 for PCT Applications No. PCT/US2013/026102.
U.S. Office Action mailed Apr. 16, 2013 for U.S. Appl. No. 13/273,354, filed Oct. 14, 2011.
U.S. Office Action mailed Jan. 16, 2014 for U.S. Appl. No. 12/718,189, filed Mar. 5, 2010.
U.S. Final Office Action mailed Jul. 31, 2014 for U.S. Appl. No. 12/718,189, filed Mar. 5, 2010.
U.S. Office Action mailed Oct. 9, 2014 for U.S. Appl. No. 13/606,528, filed Sep. 7, 2012.

* cited by examiner

800

Receive a performance indicator associated with a first mode from a set of modes associated with a cellular network area.
802

Calculate, using the performance indicator associated with the first mode, a first metric value, the first metric value being associated with a first metric and an objective of the first mode.
804

Calculate, using the first metric value, a second metric value, the second metric value being associated with a second metric and an objective of a second mode from the set of modes, the second metric value at least partially compensating for a change in a performance indicator associated with the second mode when the first metric value is implemented.
806

Send a signal associated with the first metric value and a signal associated with the second metric value to at least one antenna module associated with the cellular network area such that the at least one antenna module implements the first metric value and the second metric value.
808

FIG. 8

METHODS AND APPARATUS FOR COORDINATION IN MULTI-MODE NETWORKS

CROSS-REFERENCE TO RELATED APPLICATIONS

This application claims priority to and the benefit of U.S. Provisional Patent Application No. 61/600,223, filed Feb. 17, 2012, and entitled "Multi-Frequency Band and Multi-Radio Access Technology Self Optimizing Networks," which is incorporated herein by reference in its entirety.

BACKGROUND

Some embodiments described herein relate generally to multi-mode (multi-frequency band and/or multi-Radio Access Technology (RAT)) networks, and, in particular, to methods and apparatus for coordination in multi-mode Self Optimizing Networks (SONs).

Some known wireless networks implement an automated system for network optimization using SON solutions (e.g., SON products and processes), which adjust radio resources and network parameters to improve the overall network performance. Such SON solutions, however, typically are not designed to optimize or improve network performance for wireless networks that operate in multiple modes. Some other known wireless networks operate in multiple modes (e.g., multiple frequency bands and/or multiple RATs). Such multi-mode networks, however, typically do not implement SON techniques to coordinate operations in the multiple modes to obtain an overall optimization or improvement in network performance.

Accordingly, a need exists for methods and apparatus for coordinating operations in multiple modes using SON techniques, to improve or maximize the overall network performance for the multi-mode wireless networks.

SUMMARY

A non-transitory processor-readable medium stores code to cause a processor to receive a performance indicator associated with a first mode. The code causes the processor to calculate, using the performance indicator associated with the first mode, a first metric value associated with a first metric and an objective of the first mode. The code causes the processor to calculate, using the first metric value, a second metric value associated with a second metric and an objective of a second mode. The second metric value partially compensates for a change in a performance indicator associated with the second mode when the first metric value is implemented. The code causes the processor to send a signal associated with the first metric value and a signal associated with the second metric value to an antenna module such that the antenna module implements the first metric value and the second metric value.

BRIEF DESCRIPTION OF THE DRAWINGS

FIG. 8 is a flow chart illustrating a method for coordinating optimization in a multi-mode network, according to an embodiment.

DETAILED DESCRIPTION

Figure 1:
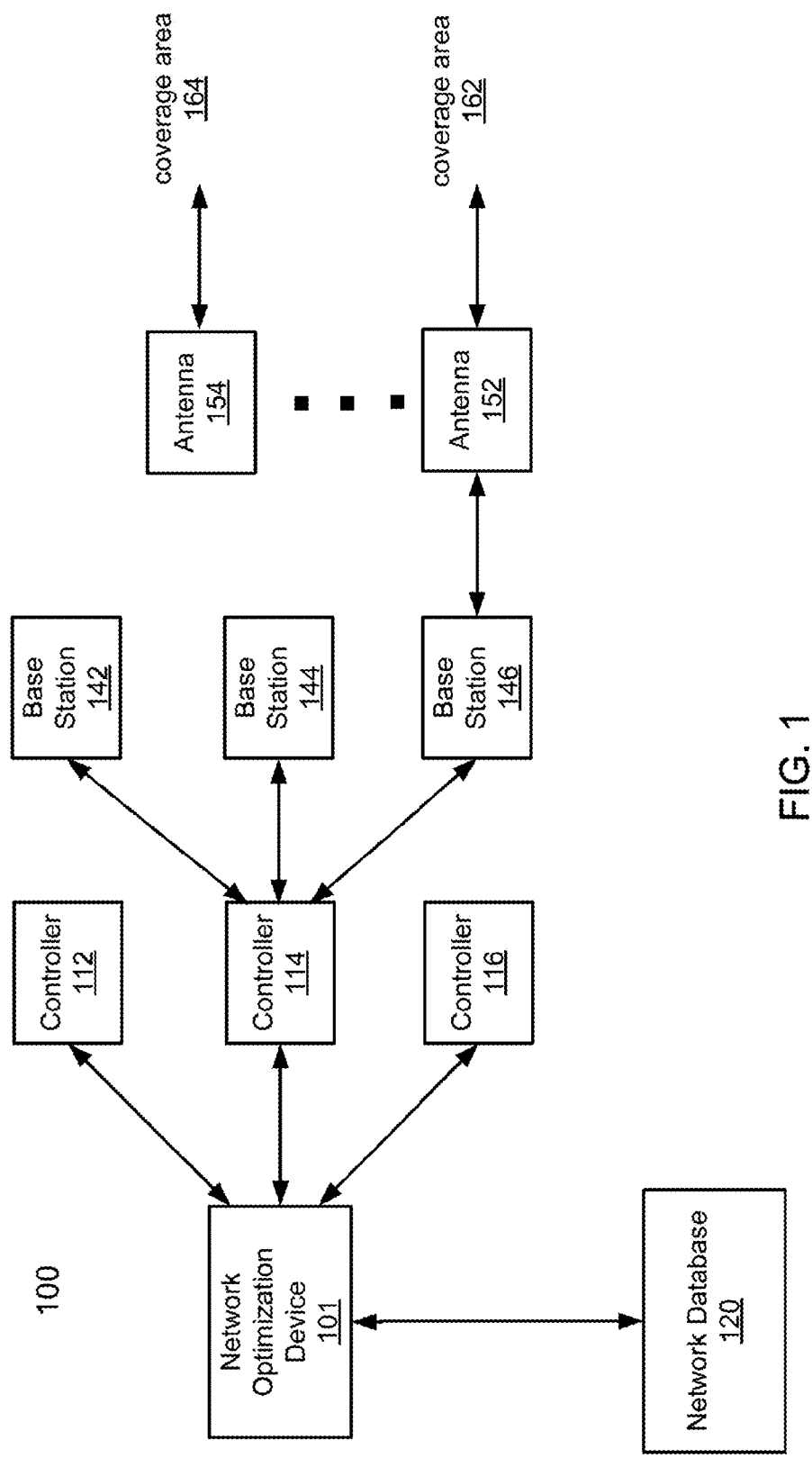
FIG. 1 is a schematic diagram that illustrates a multi-mode wireless network, according to an embodiment.

In some embodiments, a non-transitory processor-readable medium stores code representing instructions to be executed by a processor. The code stored in the medium includes code to cause the processor to receive a performance indicator associated with a first mode from a set of modes associated with a cellular network area. The code stored in the medium includes code to cause the processor to calculate, using the performance indicator associated with the first mode, a first metric value. The calculated first metric value is associated with a first metric and an objective of the first mode. The first metric can be, for example, an antenna-based metric or a parameter-based metric. The first metric value can be associated with, for example, a tilt of an antenna or a power level of the first mode. The objective of the first mode can be, for example, a Self Optimizing Network (SON) objective.

The code stored in the medium includes code to cause the processor to also calculate, using the first metric value, a second metric value. The calculated second metric value is associated with a second metric and an objective of a second mode from the set of modes. The objective of the second mode can be the same or different from the objective of the first mode. Moreover, the second metric value at least partially compensates for a change in a performance indicator associated with the second mode when the first metric value is implemented. In some instances, the performance indicator associated with the second mode can be associated with an inter-modal relationship between the first mode and the second mode.

The code stored in the medium includes code to cause the processor to further send a signal associated with the first metric value and a signal associated with the second metric value to at least one antenna module associated with the cellular network area. As a result, the at least one antenna module implements the first metric value and the second metric value. In some instances, the first metric value and the second metric value can be implemented at a single antenna or at different antennas.

In some instances, the first mode includes a first Radio Access Technology (RAT) and the second mode includes a second RAT. In some instances, the first mode includes a RAT operating in a frequency band and the second mode includes the same RAT operating in a different frequency band.

As used herein, a module can be, for example, any assembly and/or set of operatively-coupled electrical components associated with performing a specific function, and can include, for example, a memory, a processor, electrical traces, optical connectors, software (executing in hardware) and/or the like. As used herein, the singular forms "a," "an" and "the" include plural referents unless the context clearly dictates otherwise. Thus, for example, the term "a SON implementation module" is intended to mean a single module or a combination of modules configured to perform SON implementation functions.

FIG. 1 is a schematic diagram that illustrates a multi-mode wireless network 100, according to an embodiment. The wireless network 100 can be similar to the wireless networks shown and described in U.S. Patent Application Publication No. 2009/0323530, filed Apr. 17, 2009 and entitled "Dynamic Load Balancing," U.S. Patent Application Publication No. 2011/0090820, filed Oct. 16, 2009 and entitled "Self-Optimizing Wireless Network," U.S. Provisional Patent Application Ser. No. 61/532,850, filed Sep. 9, 2011 and entitled "Self Optimizing-Organizing Network Manager," and U.S. patent application Ser. No. 13/353,893, filed Jan. 19, 2012 and entitled "Methods and Apparatus for Underperforming Cell Detection and Recovery in a Wireless Network," each of which is incorporated herein by reference in its entirety.

Specifically, the wireless network 100 can be any network that enables wireless communication devices (e.g., cellular phones, Wi-Fi enabled laptops, Bluetooth devices, mobile devices, etc.) to communicate with each other. In some embodiments, the wireless network 100 can be implemented and administered using wireless transmission such as radio frequency (RF) waves. For example, the wireless network 100 can be a cellular network that enables two cellular phones to communicate with each other. For another example, the wireless network 100 can be a Wi-Fi network that enables multiple Wi-Fi enabled laptops to be operatively connected. In some embodiments, the wireless network 100 can be at least a portion of, for example, a wireless local area network (WLAN), a wireless mesh network, a wireless metropolitan area network (MAN), a wireless wide area network (WAN), a mobile device network (e.g., a global system for mobile communications (GSM) network, a personal communications service (PCS) network), a radio access network (RAN), a long term evolution (LTE) network, a Universal Mobile Telecommunications System (UMTS) network, and/or the like.

As shown in FIG. 1, the wireless network 100 includes a network optimization device 101, a network database 120, one or more controllers (e.g., controllers 112, 114, 116), and one or more network elements such as base stations (e.g., base stations 142, 144, 146) for supporting data communication between subscriber devices (not shown in FIG. 1) distributed throughout coverage areas defined or established by the wireless network 100 via one or more antennas (e.g., antennas 152, 154).

The network optimization device 101 is operatively coupled to the network database 120. The network optimization device 101 is also operatively coupled to and configured to manage the one or more controllers (e.g., controllers 112, 114 and 116). Each controller (e.g., the controller 114) is operatively coupled to and configured to manage one or more network elements (e.g., base stations 142, 144 and 146). A controller can be any device that is capable of sending control signals (e.g., commands, instructions, requests, etc.) to the network element(s) controlled by that controller, thus managing operations of the network element(s). In some embodiments, a controller can be, for example, a server or similar computer device. In some embodiments, a controller can also be considered a network element of the wireless network 100.

A network element (e.g., the base station 142, 144 or 146) controlled by a controller (e.g., the controller 114) can be any device or infrastructure that can be wirelessly coupled to and communicate with one or more wireless communication devices (e.g., subscribers to the wireless network 100). In some embodiments, such a network element (e.g., the base station 146) can be equipped with and configured to control one or more antennas (e.g., the antennas 152 and 154), which can be used to support data communications (e.g., transmit data to and/or receive data from) between that network element and the wireless communication devices (not shown in FIG. 1) that are distributed throughout a coverage area(s) (or sector(s)) associated with those antennas. For example, as shown in FIG. 1, the antenna 152 can support data communications between the base station 146 and wireless communication devices distributed within the coverage area 162; the antenna 154 can support data communications between a base station where the antenna 154 is located and wireless communication devices distributed within the coverage area 164. In some embodiments, a network element (e.g., base station) controlled by a controller can be located at, for example, a cell site. In such embodiments, the coverage area associated with an antenna of that network element can be referred to as a cell.

In some embodiments, the connections between the network optimization device 101 and the one or more controllers (e.g., the controllers 112, 114 and 116) and the network database 120 can include, for example, a wireless connection, a wired connection, and/or a combination of wireless and wired connections. Similarly, the connections between each controller (e.g., the controller 114) and its associated network element(s) (e.g., the base stations 142, 144 and 146) can include, for example, a wireless connection, a wired connection and/or a combination of wireless and wired connections.

The network database 120 can be implemented in a memory or other storage device that is part of the network optimization device 101 or another device operatively coupled to the network optimization device 101. The network database 120 can be configured to receive and store information and/or data associated with the wireless network 100, such as network statistics, current network configurations, and performance indicators of the wireless network 100. Furthermore, the network database 120 can be configured to provide or send the stored information and/or data to the network optimization device 101. The information and/or data can be used at the network optimization device 101 to monitor, optimize or improve network performance of the wireless network 100, as described in detail with respect to FIGS. 2-8. Such information and/or data can include, but not limited to, key performance Indicators (KPIs) such as transmitted radio power level value of a cell, a successful call rate (SCR) value of a cell, traffic statistical values associated with a cell, handover statistical values associated with a cell, a drop call rate (DCR) value associated with a cell, and/or the like. While shown in FIG. 1 as being located on a single device, in some embodiments, the functionality of the network database 120 can be distributed to multiple devices (e.g., multiple databases) across the wireless network 100.

The network optimization device 101 can be any device configured to control, coordinate and/or execute one or more optimization processes (e.g., hardware processes and/or software processes executed in hardware) for performing optimization of network parameters in the wireless network 100. In some embodiments, the network optimization device 101 can be, for example, a compute device, a server device, an application server, a mobile device, a workstation, and/or the like. As shown in FIG. 1, the network optimization device 101 can be directly or operatively coupled to the remaining devices within the wireless network 100. Specifically, the network optimization device 101 can be operatively coupled to the network elements (e.g., the base stations 142, 144 and 146) via one or multiple intermediate modules and/or devices such as, for example, a controller (e.g., the controller 112, 114 or 116) and/or the like. In some embodiments, the network optimization device 101 can be coupled to the remaining devices of the wireless network 100 via any suitable connecting mechanism such as, for example, optical connections (e.g., optical cables and optical connectors), electrical connections (e.g., electrical cables and electrical connectors), wireless connections (e.g., wireless transceivers and antennas), and/or the like. Furthermore, while shown in FIG. 1 as a single device, in some embodiments, the functionality of the network optimization device 101 can be distributed to multiple devices (e.g., multiple servers) across the wireless network 100.

In some embodiments, the network optimization device 101 can be configured to execute one or more SON processes for various purposes. Such SON processes can be similar to the SON processes shown and described in U.S. Patent Application Publication No. 2011/0090820, filed Oct. 16, 2009 and entitled "Self-Optimizing Wireless Network," which is incorporated herein by reference in its entirety. Such SON processes can include an antenna-based SON process, a parameter-based SON process, or a combined antenna- and parameter-based SON process. Such SON processes can include, for example, a load balancing SON process, a co-channel interference SON process, a neighbor list SON process, a handover optimization SON process, a self-healing SON process, and/or the like.

In some embodiments, communication infrastructure and devices (e.g., base stations, antennas) of the wireless network 100 can operate within a multi-mode deployment, such as a multi-frequency band deployment and/or a multi-RAT deployment. Multi-frequency band deployments of wireless communication systems refer to providing communication services over different frequency bands (e.g., 850, 900, 1800 and 1900 MHz frequency bands) within the same cell site over the same or different antennas. Multi-RAT deployments of wireless communication systems refer to providing communication services over different radio access technologies (e.g., Code Division Multiple Access (CDMA), Time Division Multiple Access (TDMA), Frequency Division Multiple Access (FDMA), Long Term Evolution (LTE), etc.), within the same cell site over the same or different antennas. In some embodiments, multi-frequency band and multi-RAT deployments can be collectively referred to as multi-mode deployments. In such embodiments, a mode can be defined based on, for example, a unique combination of a given frequency band and a given RAT. For example, providing communication services using CDMA over the 850 MHz frequency band can be defined as operating in a first mode; providing communication services using CDMA over the 900 MHz frequency band can be defined as operating in a second mode; and providing communication services using TDMA over the 900 MHz frequency band can be defined as operating in a third mode.

The wireless network 100 can be configured to perform and/or execute multi-mode optimization objectives implemented in the same and/or separate antennae environments. Specifically, the network optimization device 101 can be configured to monitor, optimize and/or improve network performance of the wireless network 100 that operates in multiple modes (e.g., multi-frequency bands and/or multi-RATs). Particularly, the network optimization device 101 can be configured to coordinate optimization across multiple modes by compensating for performance degradation related to multi-mode deployment and optimization. Details of coordination for optimization across multiple modes are further described below and with respect to FIGS. 2-8.

In some embodiments, an optimization objective associated with a mode (e.g., communication in a certain frequency band and/or using a certain RAT) can be a SON objective. Furthermore, optimization objectives for various modes (e.g., communication in multiple frequency bands, communication using multiple RATs) can be the same SON objective or different SON objectives. In such embodiments, SON techniques can be applied to optimize or improve performance associated with one or multiple modes of the wireless network 100. The SON techniques can be similar to the SON techniques described in U.S. Patent Application Publication No. 2011/0090820, filed Oct. 16, 2009 and entitled "Self-Optimizing Wireless Network," and U.S. Provisional Patent Application Ser. No. 61/532,850, filed Sep. 9, 2011 and entitled "Self Optimizing-Organizing Network Manager," each of which is incorporated herein by reference in its entirety.

In some embodiments, when applying SON techniques to multi-frequency band and/or multi-RAT deployments, the network optimization device 101 can make various determinations with respect to achieving overall optimization or improvement for network performance of the wireless network 100. For example, the network optimization device 101 can determine to include or exclude certain frequency bands or RATs for optimization goals. For another example, the network optimization device 101 can execute SON processes to apply changes on network parameters, where the changes applied on network parameters can be different for different frequency bands and/or RATs (e.g., due to differences in propagation characteristics, signal strength and quality requirements for different frequency bands and/or RATs).

In some embodiments, when the SON objectives are common for the multiple frequency bands and/or multiple RATs, the network optimization device 101 can apply changes (as a result of executing SON processes) differently to the network parameters corresponding to the frequency bands and/or RATs. For example, if the network parameter to be altered to meet SON objectives is antenna tilt, and if two frequency bands are transmitted over different antennas, the network optimization device 101 can calculate the output tilt changes differently for the two antennas for example due to the propagation differences between the two frequency bands. On the other hand, if the two frequency bands are transmitted over the same antenna, the network optimization device 101 can determine a tilt change made to the common antenna for both frequency bands, and then compensate the difference in propagation characteristics by modifying an additional parameter to meet or exceed the common SON objectives (e.g., changing the power on the transmission of one of the frequency bands over the common antenna).

In some embodiments, when the SON objectives are different for different frequency bands and/or RATs, the network optimization device 101 can apply SON processes independently to the frequency bands and/or RAT transmissions. Furthermore, in some embodiments, when different RATs are transmitted over the same antenna and the network parameter to be changed (as specified by an SON process) is an antenna parameter, the network optimization device 101 can compensate for the performance change caused by the change of antenna parameter that is intended for one of the RATs by a modification on a parameter (e.g. power) specific to another RAT, such that the effective service associated with the other RAT can remain substantially unchanged.

Figure 2:
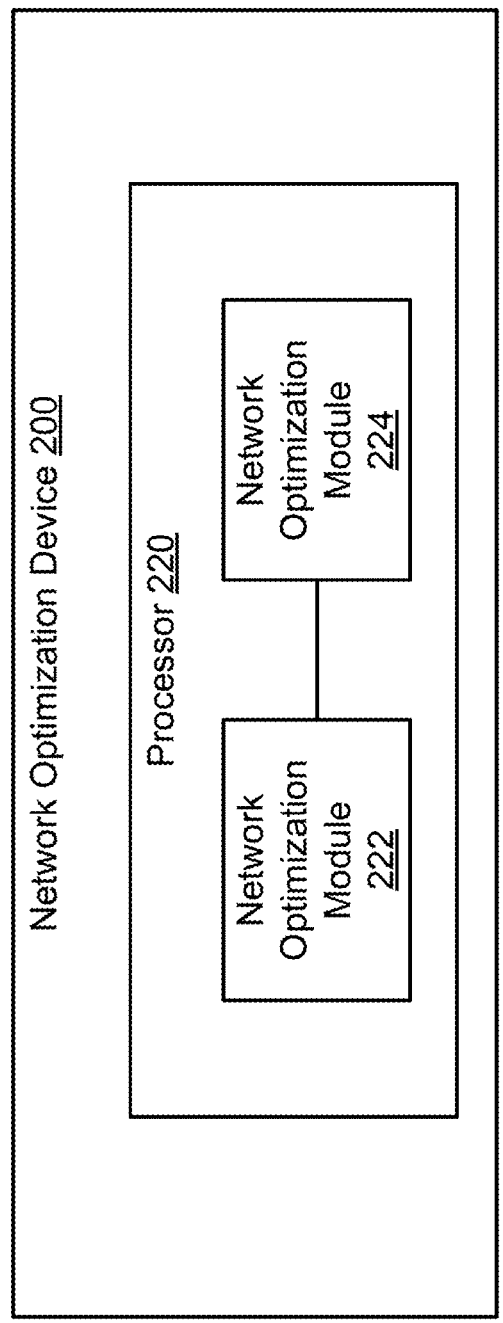
FIG. 2 is a block diagram of a network optimization device configured to coordinate optimization in a multi-mode network, according to an embodiment.
Figure 3:
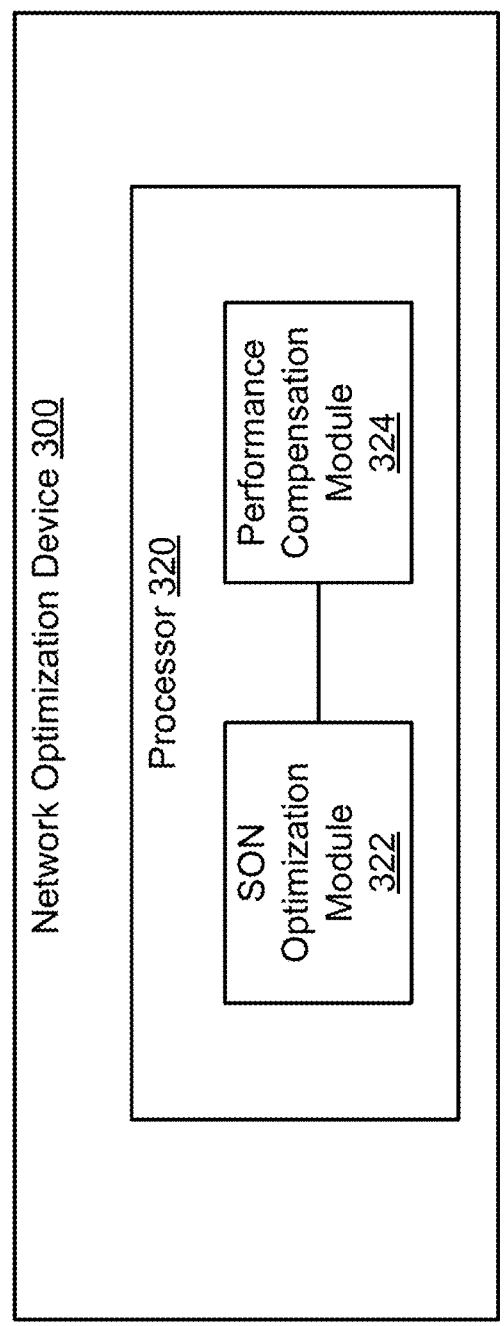
FIG. 3 is a block diagram of a network optimization device configured to coordinate optimization in a multi-mode network, according to another embodiment.

In some embodiments, the process for coordinating optimization of network parameters across multiple modes in the wireless network 100 can be executed at a processor of the network optimization device 101. FIG. 2 and FIG. 3 each illustrate a block diagram of a network optimization device configured to coordinate optimization in a multi-mode wireless network, according to an embodiment. The network optimization device shown in FIG. 2 (i.e., network optimization device 200) or FIG. 3 (i.e., network optimization device 300) can be structurally and functionally similar to the network optimization device 101 shown and described with respect to FIG. 1. The multi-mode wireless network hosting the network optimization device 200 or the multi-mode wireless network hosting the network optimization device 300 can be similar to the wireless network 100 shown and described with respect to FIG. 1. Although not shown in FIG. 2 or FIG. 3, the network optimization device 200 or 300 can include other components such as a memory, a series of communication ports, and/or the like. In some instances, the network optimization device 200 or 300 each can be a single physical device. In other instances, the network optimization device 200 or 300 can include multiple physical devices, each of which can include one or multiple modules (shown in FIG. 2 or FIG. 3) and/or other components (not shown in FIG. 2 or FIG. 3) of the processor 220 or processor 320.

As shown in FIG. 2, the processor 220 includes network optimization modules 222 and 224 that are operatively coupled to each other. Although not shown in FIG. 2, in some embodiments, the processor 220 can include more or less than two network optimization modules, and/or other modules and/or components associated with coordinating the optimization process across multiple modes such as, for example, a monitor module (monitoring performance of network elements controlled by the network optimization device 200), a detector module (detecting any malfunction or other problem at network elements controlled by the network optimization device 200), a communication module (transmitting control signals to and/or receiving data from network elements controlled by the network optimization device 200), and/or the like. Each module in the processor 220 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 220) capable of performing one or more specific functions associated with that module. The processor 220 can be any suitable processor configured to run and/or execute those modules.

Each of the network optimization modules 222, 224 can be associated with at least one mode from a set of modes, in which network devices (e.g., base stations) of the multi-mode wireless network operate. That is, each network optimization module 222, 224 can be configured to optimize or improve performance of network devices that operate in its associated mode(s). As discussed above, a mode can be defined, for example, as a unique combination of a frequency band and a RAT. For example, the network optimization module 222 can be associated with a first mode of CDMA and a 850 MHz frequency band; the network optimization module 224 can be associated with a second mode of FDMA and a 1800 MHz frequency band. In other words, the network optimization module 222 can be configured to optimize or improve performance of network devices of the first mode, which operate using CDMA over the 850 MHz frequency band; the network optimization module 224 can be configured to optimize or improve performance of network devices of the second mode, which operate using FDMA over the 1800 MHz frequency band. Furthermore, in some embodiments, the network optimization module 222 or 224 can be associated with more than one mode.

In some embodiments, to optimize or improve performance of network devices that operate in one or more given modes, the network optimization module 222 or 224 can be configured to, among other functions, receive performance indicators associated with a given mode; calculate metric values associated with the given mode based on the received performance indicators; and send signals including the metric values such that the metric values can be implemented at corresponding network devices.

In operation, the network optimization module 222 can receive a performance indicator associated with the first mode from network device(s) operating in the first mode. The performance indicator can be used to evaluate performance of the first mode with respect to an optimization objective for the first mode. Such an optimization objective can be a SON objective such as, for example, enlarging coverage of a cell, increasing SCR for the first mode, etc. In some instances, the received performance indicator can be a KPI such as, for example, transmitted radio power level value of a cell, a SCR value of a cell, traffic statistical values associated with a cell, handover statistical values associated with a cell, a DCR value associated with a cell, and/or the like. For example, the performance indicator associated with the first mode can be coverage of a cell associated with an antenna that can operate in the first mode.

After receiving the performance indicator associated with the first mode, the network optimization module 222 can calculate a metric value associated with a first metric based on the received performance indicator. The first metric can be an antenna parameter (e.g., antenna tilt) or a non-antenna parameter (e.g., a parameter used in an algorithm executed at a network device) associated with the first mode. The metric value for the first metric can represent a modification of the antenna parameter or the non-antenna parameter. In some instances, such a metric value can be a modified value of the parameter. In some other instances, such a metric value can be a difference between the original value and the modified value of the parameter. In some instances, the metric value for the first metric can be calculated using any suitable method such that the optimization objective for the first mode can be satisfied when the calculated metric value is implemented at the corresponding network device(s).

In the above example, the first metric can be the tilt for the antenna that can operate in the first mode. The calculated metric value for the first metric can be a modified value of the tilt. The modified value of the tilt can be calculated at the network optimization module 222 to enlarge coverage of the antenna when the antenna operates in the first mode. As a result, when the calculated metric value for the first metric is implemented at the antenna, the tilt of the antenna can be changed such that the coverage of the antenna can be enlarged when the antenna operates in the first mode.

After the metric value for the first metric is calculated, the network optimization module 222 can send a signal including the metric value to the corresponding network device(s) where the metric value can be implemented. In some embodiments, when the metric value is a modification on an antenna parameter, the network optimization module 222 can send the signal including the metric value to, for example, an antenna module, which in turn can implement the modification of the antenna parameter at the corresponding antenna(s).

Furthermore, the network optimization module 222 can send the metric value for the first metric to the network optimization 224. The network optimization module 224 can then calculate a metric value associated with a second metric based on the received metric value for the first metric. Similar to the first metric, the second metric can be a parameter (e.g., an antenna parameter, a non-antenna parameter) associated with the second mode. Similar to the metric value for the first metric, the metric value for the second metric can represent a modification (e.g., a modified value or a difference) of the parameter associated with the second mode. In some instances, the metric value for the second metric can be calculated using any suitable method such that an effect on a performance indicator for the second mode can be reduced, where the effect is caused by implementation of the metric value for the first metric.

In the above example, the network optimization module 222 can send the modified antenna tilt to the network optimization module 224. The network optimization module 224 can then calculate a new handover threshold associated with the first mode and the second mode, which corresponds to the new coverage of the antenna for the first mode after the modified antenna tilt is applied. As a result, the inter-modal relationship between the first mode and the second mode is maintained with respect to handovers between the coverage of the first mode and the coverage of the second mode.

After the metric value for the second metric is calculated, the network optimization module 224 can send a signal including the metric value to the corresponding network device(s) where the metric value can be implemented. In some embodiments, when the metric value is a modification on an antenna parameter, the network optimization module 224 can send the signal including the metric value to, for example, an antenna module, which in turn can implement the modification of the antenna parameter at the corresponding antenna(s).

As shown in FIG. 3, the network optimization device 300 illustrates an alternative design of a network optimization device that is different from the design for the network optimization device 200 shown and described with respect to FIG. 2. Specifically, the processor 320 includes a SON optimization module 322 and a performance compensation module 324 that are operatively coupled to each other. Although not shown in FIG. 3, in some instances, the processor 320 can include other modules and/or components associated with coordinating the optimization process across multiple modes such as, for example, a monitor module (monitoring performance of network elements controlled by the network optimization device 300), a detector module (detecting any malfunction or other problem at network elements controlled by the network optimization device 300), a communication module (transmitting control signals to and/or receiving data from network elements controlled by the network optimization device 300), and/or the like. Each module in the processor 320 can be any combination of hardware-based module (e.g., a FPGA, a ASIC, a DSP) and/or software-based module (e.g., a module of computer code stored in memory and/or executed at the processor 320) capable of performing one or more specific functions associated with that module. The processor 320 can be any suitable processor configured to run and/or execute those modules.

The SON optimization module 322 can be configured to, among other functions, implement SON objectives by making changes to one or more parameters (e.g., antenna parameters and/or non-antenna parameters) based on the SON objectives. The performance compensation module 324 can be configured to, among other functions, compensate for performance degradation that occurs as a result of the parameter changes (caused by the SON optimization module 322 and based on SON objectives) by affecting certain other parameters (e.g., antenna parameters and/or non-antenna parameters).

In operation, the SON optimization module 322 can receive a performance indicator associated with a first mode, as well as a value of a performance indicator associated with a second mode. Similar to the performance indicators described above with respect to FIG. 2, the performance indicator associated with the first mode can be used to evaluate performance of the first mode with respect to an optimization objective (e.g., a SON objective) for the first mode; the performance indicator associated with the second mode can be used to evaluate performance of the second mode with respect to an optimization objective (e.g., a SON objective) for the second mode. In some embodiments, the optimization objective for the first mode and the optimization objective for the second mode can be the same. In other embodiments, the two optimization objectives can be different. Additionally, in some embodiments, the performance indicator associated with the second mode can be associated with an inter-modal relationship (e.g., load balancing, handoff, etc.) between the first mode and the second mode.

After receiving the performance indicators, the SON implementation module 322 can then calculate a first metric value using the value of the performance indicator associated with the first mode. The first metric value can be a value (e.g., a modified value) for an antenna parameter (e.g., antenna tilt) or a non-antenna parameter (e.g., a parameter used in an algorithm executed at a network device) associated with the first mode and/or the second mode. In some instances, the first metric value can be calculated using any suitable method such that the performance of the first mode can be improved when the first metric value is implemented. Furthermore, in some instances, the first metric value, when implemented at the corresponding network device(s), can affect both the performance indicator associated with the first mode and the performance indicator associated with the second mode.

For example, the performance indicator for the first mode can be a coverage of an antenna when the antenna operates in the first mode, and the performance indicator for the second mode can be a DCR for the second mode when the antenna operates in the second mode (assume that the antenna is a multi-mode antenna that can operate in both the first mode and the second mode). After receiving the two performance indicators, the SON implementation module 322 can calculate a tilt value for the antenna using the value of the performance indicator associated with the first mode. Such a calculated tilt value, when applied at the multi-mode antenna, can enlarge the coverage of the antenna when the antenna operates in the first mode, but also increase the DCR for the second mode when the antenna operates in the second mode.

After the first metric value is calculated, the SON implementation module 322 can send a signal including the first metric value to corresponding network device(s) to implement the first metric value. In some embodiments, when the first metric value is a value for an antenna parameter, the SON implementation module 322 can send the signal including the first metric value to, for example, an antenna module associated with the first mode, which in turn can implement the first metric value at corresponding antenna(s).

Furthermore, the SON implementation module 322 can send the first metric value to the performance compensation module 324. The performance compensation module 324 can then calculate a second metric value using the first metric value. Similar to the first metric value, the second metric value can be a value (e.g., a modified value) for an antenna parameter (e.g., antenna tilt) or a non-antenna parameter (e.g., handover threshold) associated with the first mode and/or the second mode. Particularly, the second metric value can be calculated using any suitable method such that an effect on the performance indicator for the second mode can be compensated, where the effect is caused by implementation of the first metric value. In some embodiments, the second metric value can be calculated such that the performance indicator for the second mode after the second metric value is implemented is within a predetermined range of the performance indicator for the second mode that was previously received at the SON implementation module 322.

In the above example, the SON implementation module 322 can send the calculated tilt value to the performance compensation module 324. The performance compensation module 324 can calculate a transmit power (e.g., a modified transmit power) for the multi-mode antenna when the antenna operates in the second mode. Such a calculated transmit power, when applied at the multi-mode antenna, can compensate the effect on the performance of the second mode (i.e., the increase of DCR) caused by implementation of the calculated tilt value. As a result, the resulted DCR for the second mode after the calculated transmit power is applied at the multi-mode antenna (when the antenna operates in the second mode) is within a predetermined range of the previous DCR for the second mode, which was received at the SON implementation module 322 before the calculated tilt was applied at the multi-mode antenna (when the antenna operates in the first mode).

Additionally, the performance compensation module 324 can send a signal including the second metric value to corresponding network device(s) to implement the second metric value. In some embodiments, when the second metric value is a value for an antenna parameter, the performance compensation module 324 can send the signal including the second metric value to, for example, an antenna module associated with the second mode, which in turn can implement the second metric value at corresponding antenna(s).

FIGS. 4-7 illustrate multi-mode wireless networks configured to coordinate for optimization across multiple modes based on various combinations of SON objectives and antenna configurations. Specifically, four scenarios are considered for multi-mode deployments: 1) common SON objectives and separate antennas; 2) common SON objectives and same antennas; 3) different SON objectives and separate antennas; and 4) different SON objectives and same antennas. Each of these four scenarios is discussed below in connection with FIGS. 4-7.

In some multi-mode deployments of wireless communication systems, the SON objectives for the multiple modes can be common. The changes made to the network parameters (e.g., antenna parameters, non-antenna parameters) to meet these common SON objectives may, however, be different for the different modes due to, for example, the difference in the propagation characteristics of the modes, different service and quality requirements of the modes, and/or the like.

Figure 4:
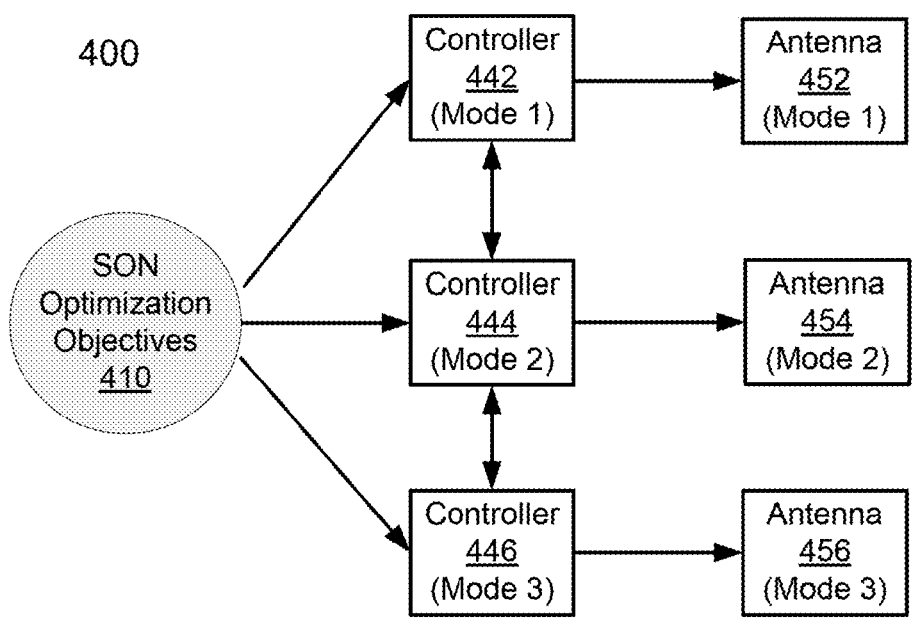
FIG. 4 illustrates a multi-mode wireless network configured to coordinate optimization based on common SON objectives and separate antennas for multiple modes, according to an embodiment.

In some embodiments, multiple modes associated with common SON objectives can be transmitted over separate antennas. FIG. 4 illustrates a multi-mode wireless network 400 configured to coordinate optimization based on common SON objectives 410 and separate antennas (e.g., antennas 452, 454, 456) for the multiple modes (e.g., modes 1, 2, 3), according to an embodiment. The multi-mode wireless network 400 includes multiple mode-specific controllers (e.g., controllers 442, 444, 446) that share common SON objectives 410. Each mode-specific controller is associated with one or more modes. For example, as shown in FIG. 4, the controllers 442, 444 and 446 are associated with mode 1, mode 2 and mode 3, respectively. Each mode 1, 2, 3 can be a unique combination of a frequency band (e.g., 900 MHz, 1800 MHz) and a RAT (e.g., CDMA, LTE). Although not shown in FIG. 4, in some embodiments, a mode-specific controller can be associated with more than one mode.

Each mode-specific controller controls one or more antennas that operate in one of the specific mode(s) associated with that mode-specific controller. For example, as shown in FIG. 4, the controller 442 controls antenna 452 that operates in mode 1; the controller 444 controls antenna 454 that operates in mode 2; the controller 446 controls antenna 456 that operates in mode 3. Although not shown in FIG. 4, in some embodiments, a mode-specific controller can control more than one antenna. The multi-mode wireless network 400 can be similar to the multi-mode wireless network 100 shown and described with respect to FIG. 1. Particularly, the controllers 442, 444, 446 can be similar to the controllers 112, 114, 116 shown and described with respect to FIG. 1. The antennas 452, 454, 456 can be similar to the antennas 152, 154 shown and described with respect to FIG. 1.

In some embodiments, instructions or signals implementing the common SON objectives 410 can be communicated, by a processor (not shown in FIG. 4) for example, to the mode-specific controllers (e.g., controllers 442, 444, 446). As a result, the mode-specific controllers can calculate which parameters are to be changed, and how to be changed, to implement the SON objectives 410. The parameters to be modified to substantially meet the common SON objectives 410 (or meet the SON objectives 410 within an acceptable range of values) can include antenna parameters such as, for example, tilt, transmit power, azimuth, beam-width and/or the like.

The modification applied to the antennas 452, 454, 456 corresponding to the different modes 1, 2, 3 can be calculated differently to meet the same SON objectives 410. In some embodiments, different parameters can be calculated for different modes. For example, the controller 442 can be configured to calculate modification on a tilt of the antenna 452 to meet the SON objectives 410 for mode 1; the controller 444 can be configured to calculate modification on a transmit power of the antenna 454 to meet the SON objectives 410 for mode 2; and the controller 446 can be configured to calculate modification on a beam-width of the antenna 456 to meet the SON objectives 410 for mode 3. In some other embodiments, the same parameter can be calculated differently for different modes. For example, if an antenna tilt is to be modified to meet the SON objectives 410 and mode 1 has more lossy propagation characteristics than mode 2, then the antenna 452 for mode 1 can be tilted less than the antenna 454 for mode 2 to maintain the common cell coverage boundary as dictated by the common SON objectives 410.

In some embodiments, the calculations for antenna-parameter modifications can be performed at each mode-specific controller for the corresponding mode. For example, the calculations for antenna-parameter modifications for mode 1, 2 and 3 are performed at the controller 442, 444 and 446, respectively. Alternatively, as shown and described with respect to FIGS. 1-3, calculations for modifications on antenna-parameters associated with the multiple modes can be performed at a centralized location such as a network optimization device (not shown in FIG. 4) similar to the network optimization device 101, 200 or 300.

After determining the parameter values, the controllers then can send (or the centralized device can send via the controllers) these parameter values to the respective antennas that they control (i.e., the antennas transmitting/receiving signals in a particular mode). As a result, the modified parameter values can be implemented at the respective antennas. Thus, a round of optimization is completed.

Figure 5:
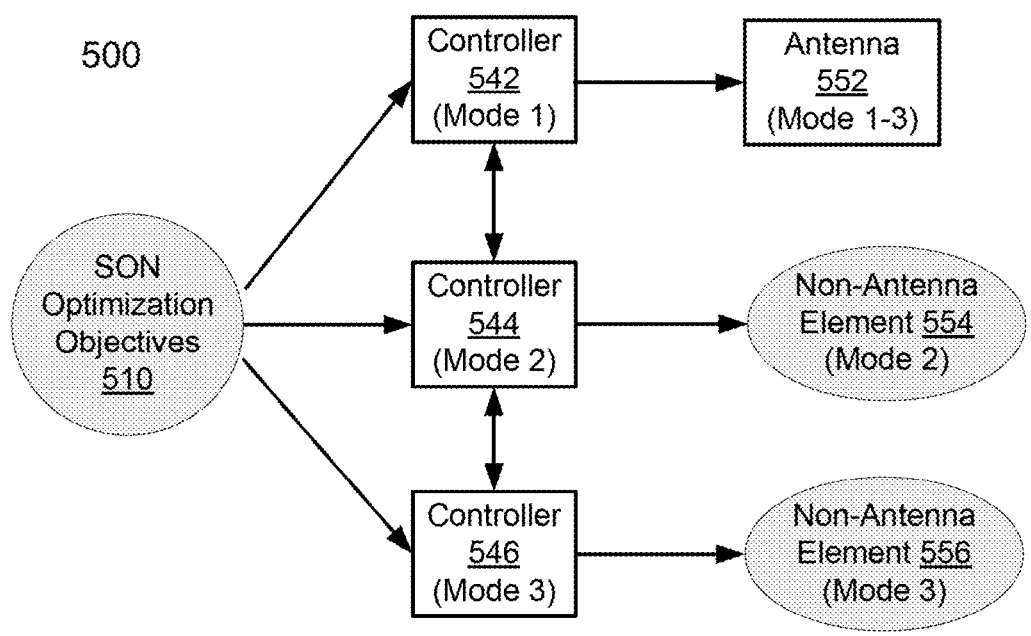
FIG. 5 illustrates a multi-mode wireless network configured to coordinate optimization based on common SON objectives and the same antenna for multiple modes, according to an embodiment.

In some embodiments, multiple modes associated with common SON objectives can be transmitted over the same antenna. FIG. 5 illustrates a multi-mode wireless network 500 configured to coordinate optimization based on common SON objectives 510 and the same antenna 552 for the multiple modes (e.g., modes 1, 2, 3), according to an embodiment. Similar to the multi-mode wireless network 400 show and described with respect to FIG. 4, the multi-mode wireless network 500 includes multiple mode-specific controllers (e.g., controllers 542, 544, 546) that share common SON objectives 510. Each mode-specific controller is associated with one or more modes. For example, as shown in FIG. 5, the controllers 542, 544 and 546 are associated with mode 1, mode 2 and mode 3 respectively. In some embodiments, the multi-mode wireless network 500 can include one or more controllers (not shown in FIG. 5) that can operate in all the modes, which can calculate the modifications for all the modes.

Each mode 1, 2, 3 can be a unique combination of a frequency band (e.g., 900 MHz, 1800 MHz) and a RAT (e.g., CDMA, LTE). Although not shown in FIG. 5, in some embodiments, a mode-specific controller can be associated with more than one mode. All the mode-specific controllers are associated with a single multi-mode antenna 552 that can operate in the multiple modes (e.g., modes 1, 2, 3). Although not shown in FIG. 5, in some embodiments, the multi-mode wireless network 500 can include more than one such multi-mode antenna.

For the multi-mode wireless network 500, the SON objectives 510 are the same for the multiple modes, and the parameter value(s) to be modified to meet or exceed the common SON objectives 510 can be related to an antenna parameter(s) such as, for example, tilt, transmit power, azimuth, beamwidth and/or the like. Modification applied to the common multi-mode antenna 552 can be calculated for a specific mode (e.g., mode 1) in a similar way as described above with FIG. 4. After such a modification is determined, the modification can be compensated by modifications to one or more non-common, non-antenna parameters corresponding to the other modes to meet the same SON objectives 510 for the other modes.

Specifically, the common SON objectives 510 can be communicated, by a processor (not shown in FIG. 5) for example, to the mode-specific controller 542 where modification for the antenna parameter specific to mode 1 can be calculated. Subsequently, the calculated modification can be sent from the mode-specific controller 542 to the multi-mode antenna 552 such that the modification can be applied at the antenna 552. After the modification specific to mode 1 is calculated at the controller 542, the parameter changes for the other modes (e.g., mode 2 and mode 3) can be calculated for network elements other than antennas (e.g., non-antenna elements 554, 556) based on the calculated modification on the antenna 552. The calculated changes to the non-antenna parameters can then be communicated to those mode-specific network elements to be implemented.

In some embodiments, the multiple mode-specific controllers (e.g., controllers 542, 544, 546) can perform the related calculations and communications for the common multi-mode antenna (e.g., the antenna 552) and/or the non-antenna network elements (e.g., the non-antenna elements 554, 556) either individually or in co-operation. In some other embodiments, although not shown in FIG. 5, a single controller that operates in all the modes can receive instructions or signals representing the common SON objectives and then make the related calculations and communications without involvement of other network element or component (e.g., other controllers).

As an example, if an antenna tilt is to be modified to satisfy the SON objectives 510, the modification on the antenna tilt can be applied at the common antenna 552 according to one of the modes that are operated by the common antenna 552. Next, the transmit power of the other modes can be modified accordingly to maintain the common cell coverage boundary as dictated by the common SON objectives 510. Specifically, when a downtilt operation is executed on the common antenna 552 based on one of the modes, a mode from the remaining modes that has more lossy propagation characteristics can have its transmit power increased; another mode from the remaining modes that has less lossy propagation characteristics can have its transmit power decreased. Thus, the common cell coverage boundary as dictated by the common SON objectives 510 can be maintained for both of the modes. Conversely, an uptilt operation based on one of the modes can be compensated by a decrease in transmit power of the remaining modes with more lossy propagation characteristics, and an increase in transmit power of the remaining modes with less lossy propagation characteristics. Similarly, the common cell coverage boundary as dictated by the common SON objectives 510 can be maintained for the remaining modes.

In some multi-mode deployments of wireless communication systems, the traffic loading and service quality over different modes can be independent of each other. In such embodiments, different SON objectives and independent SON mechanisms can be applied to the different modes. On one hand, when the different modes are transmitted over the same antenna, changes made to antenna parameters based on the SON objectives of one mode may affect the performance of the other modes. Such an effect on performance can be compensated by adjusting certain other parameters (e.g., non-antenna parameters) specific to one or more of the modes. On the other hand, when the different modes are transmitted over different antennas, antenna-based SON processes can be managed independently, but may still allow for coordination for interactions between modes such as inter-modal load balancing and inter-modal handoffs.

Figure 6:
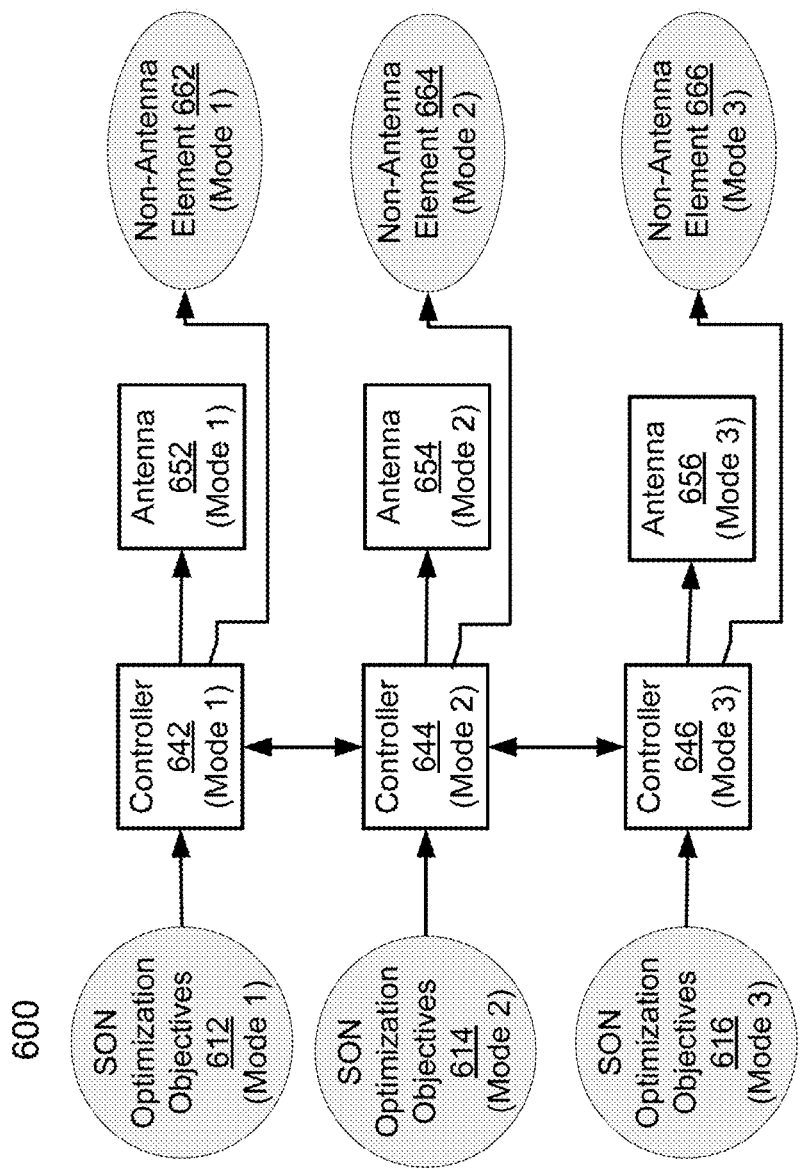
FIG. 6 illustrates a multi-mode wireless network configured to coordinate optimization based on different SON objectives and separate antennas for multiple modes, according to an embodiment.

In some embodiments, multiple modes associated with different SON objectives can be transmitted over separate antennas. FIG. 6 illustrates a multi-mode wireless network 600 configured to coordinate optimization based on different SON objectives 612, 614, 616 and separate antennas (e.g., antennas 652, 654, 656) for the multiple modes (e.g., modes 1, 2, 3), according to an embodiment. Similar to the multi-mode wireless networks 400 and 500 shown and described with respect to FIGS. 4 and 5, the multi-mode wireless network 600 includes multiple mode-specific controllers (e.g., controllers 642, 644, 646), each of which is associated with mode-specific SON objectives (e.g., SON objectives 612, 614, 616). Each mode-specific controller and its associated SON objectives are associated with a single mode. For example, as shown in FIG. 6, the controllers 642, 644, 646 and the associated SON objectives 612, 614, 616 are associated with mode 1, mode 2 and mode 3, respectively. In some embodiments, the multi-mode wireless network 600 can include one or more controllers (not shown in FIG. 6) that can operate in all the modes, which can calculate the modifications for all the modes.

Each mode-specific controller controls one or more antennas that operate in the associated specific mode, and/or one or more non-antenna network elements associated with the specific mode. For example, as shown in FIG. 6, the controller 642 controls antenna 652 that operates in mode 1 and controls the non-antenna element 662 that is associated with mode 1; the controller 644 controls antenna 654 that operates in mode 2 and controls the non-antenna element 664 that is associated with mode 2; the controller 646 controls antenna 656 that operates in mode 3 and controls the non-antenna element 666 that is associated with mode 3. Although not shown in FIG. 6, in some embodiments, a mode-specific controller can control more than one antenna and/or more than one non-antenna element.

For the multi-mode wireless network 600, although the SON objectives are different for each mode, modifications applied to the mode-specific antennas (e.g., antennas 652, 654, 656) can be calculated for each mode (e.g., mode 1, 2, 3) in a similar way as described above with FIGS. 4 and 5. For example, for mode 1, the controller 642 can calculate modifications applied to the antenna 652 based on the SON objectives 612. The antenna parameters to be modified to meet or exceed the mode-specific SON objectives can include, for example, tilt, transmit power, azimuth, beam-width and/or the like.

For the multi-mode wireless network 600 that operates with multiple mode-specific SON objectives, inter-modal relationships (e.g., inter-modal handoff, inter-modal load balancing, etc.) may be affected when antenna parameter changes are made to one or more modes as a result of the mode-specific SON objectives being implemented at the mode-specific antennas for those modes. In these scenarios, the non-antenna parameters of one or more modes can be modified to maintain inter-modal relationships affected by the SON-driven changes.

Specifically, instructions or signals representing the independent SON objectives for each mode can be communicated, by a processor (not shown in FIG. 6) for example, to the mode-specific controllers. As described above with respect to FIGS. 4 and 5, the mode-specific controllers can calculate modifications for mode-specific antenna parameters and then communicate the calculated results to the corresponding mode-specific antennas. Additionally, the mode-specific controllers can also communicate the calculated modifications for antenna parameters to the mode-specific controllers of the other modes. In response to receiving the modifications for antenna parameters from the controller associated with another mode, the other mode-specific controllers can calculate changes to non-antenna parameters based on the received changes to antenna parameters. Such changes to non-antenna parameters can be calculated in a method to compensate for the effect caused by the changes on the antenna-parameters, such that inter-modal relationships among the multiple modes that are independent of the underlying SON objectives can be maintained. The calculated changes to non-antenna parameters can then be communicated to relevant non-antenna network elements for implementation, such that inter-modal relationship coordination can be performed.

As an example, the controller 642 can calculate and implement a change on the tilt of the antenna 652 based on the SON objectives 612 for mode 1. Such a change on the antenna tilt may affect handover relationship between mode 1 and mode 2, such that performance of mode 2 is deteriorated. As a result, after receiving information associated with the change on the antenna tilt from the controller 642, the controller 644 can calculate a modification on a handover threshold between mode 2 and mode 1. Such a modification on the handover threshold can be calculated in a method to cause the handover relationship between mode 1 and mode 2 to be maintained at substantially the same level before the tilt of the antenna 652 is changed. The controller 644 can then communicate the modification on the handover threshold to the non-antenna element 664, where the modification is implemented.

In some embodiments, the calculations for antenna-parameter modifications and/or non-antenna-parameter modifications can be performed at each mode-specific controller for the corresponding mode. For example, the calculations for antenna-parameter modifications and non-antenna-parameter modifications for mode 1, 2 and 3 are performed at the controller 642, 644 and 646, respectively. Alternatively, as shown and described with respect to FIGS. 1-3, calculations for modifications on antenna-parameters and/or non-antenna parameters associated with the multiple modes can be performed at a centralized location such as a network optimization device (e.g., implemented at a centralized controller not shown in FIG. 6) similar to the network optimization device 101, 200 or 300.

Figure 7:
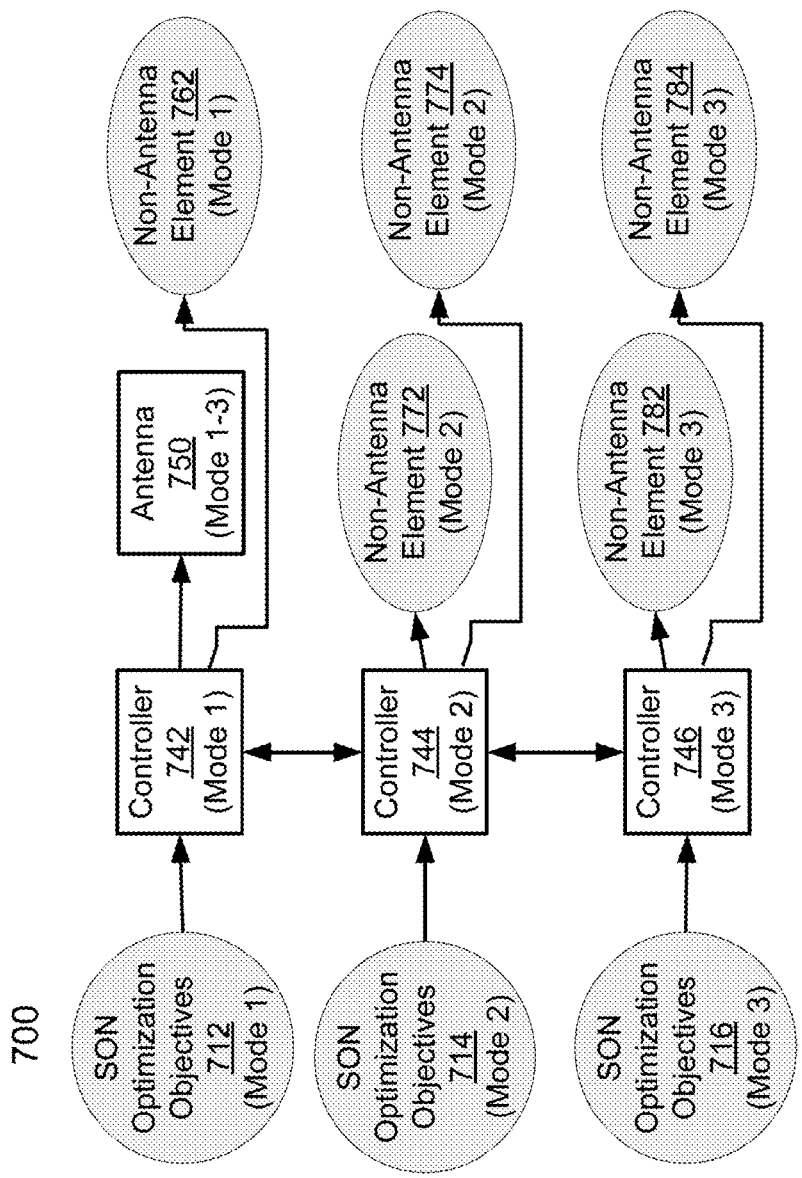
FIG. 7 illustrates a multi-mode wireless network configured to coordinate optimization based on different SON objectives and the same antenna for multiple modes, according to an embodiment.

In some embodiments, multiple modes associated with different SON objectives can be transmitted over the same antenna. FIG. 7 illustrates a multi-mode wireless network 700 configured to coordinate optimization based on different SON objectives 712, 714, 716 and the same antenna 750 for the multiple modes (e.g., modes 1, 2, 3), according to an embodiment. Similar to the multi-mode wireless network 400, 500 and 600 shown and described with respect to FIGS. 4-6, the multi-mode wireless network 700 includes multiple mode-specific controllers (e.g., controllers 742, 744, 746), each of which is associated with mode-specific SON objectives (e.g., SON objectives 712, 714, 716). Each mode-specific controller and its associated SON objectives are associated with a single mode. For example, as shown in FIG. 7, the controllers 742, 744, 746 and the associated SON objectives 712, 714, 716 are associated with mode 1, mode 2 and mode 3, respectively. In some embodiments, the multi-mode wireless network 700 can include one or more controllers (not shown in FIG. 7) that can operate in all the modes, which can calculate the modifications for all the modes.

All the mode-specific controllers are associated with a single multi-mode antenna 750 that can operate in the multiple modes (e.g., modes 1, 2, 3). Although not shown in FIG. 7, in some instances, the multi-mode wireless network 700 can include more than one such multi-mode antenna. Additionally, each mode-specific controller controls one or more non-antenna network elements associated with the specific mode. For example, as shown in FIG. 7, the controller 742 controls non-antenna element 762 that is associated with mode 1; the controller 744 controls non-antenna elements 772 and 774 that are associated with mode 2; the controller 746 controls non-antenna elements 782 and 784 that are associated with mode 3. Although not shown in FIG. 7, in some instances, a mode-specific controller can control more than two non-antenna elements.

For the multi-mode wireless network 700, each mode-specific controller can calculate modifications applied to antenna-parameters or non-antenna parameters based on the corresponding mode-specific SON objectives. Specifically, the controller 742 can calculate modifications on antenna parameters (e.g., tilt, transmit power, azimuth, beam-width, etc.) for the antenna 750 based on the SON objectives 712 for mode 1; the controller 744 can calculate modifications on non-antenna parameters (e.g., handoff threshold) for the non-antenna element 772 based on the SON objectives 714 for mode 2; the controller 746 can calculate modifications on non-antenna parameters for the non-antenna element 782 based on the SON objectives 716 for mode 3. Such calculations can be operated in a similar way as described above with respect to FIGS. 4-6.

After a modification on an antenna parameter for the multi-mode antenna 750 is determined, the modification can be compensated by modifications to one or more non-common, non-antenna parameters corresponding to the other modes to maintain inter-modal relationships that are independent of the underlying metric-specific SON objectives. As such, the performance and coverage of the other modes can be kept unaffected or affected to an acceptable extent.

Specifically, the controller 742 can calculate a change on an antenna parameter (e.g., antenna tilt) for the multi-mode antenna 750 to meet the SON objectives 712 for mode 1. The controller 742 can communicate the calculated change to the controllers 744 and 746, such that changes on non-antenna parameters can be made with respect to the other modes (e.g., modes 2 and 3) accordingly to maintain inter-modal relationships between the other modes and mode 1. For instance, the controller 744 can calculate a non-antenna-parameter change (e.g., pilot power) based on the change on the antenna parameter, and implement the non-antenna-parameter change at the non-antenna element 774 such that the coverage of mode 2 is unaffected. Similarly, the controller 746 can calculate a non-antenna-parameter change based on the change on the antenna parameter, and implement the non-antenna-parameter change at the non-antenna element 784 such that the service quality of mode 3 is unaffected. In some embodiments, the non-antenna elements used for inter-modal relationship coordination can be the same or different from the non-antenna elements used for implementing the SON objectives of one or more modes. For example, the non-antenna element 774 for inter-modal relationship for mode 2 can be the same or different from the non-antenna element 772 for implementing the SON objectives 714 for mode 2.

As an example, a downtilt in the common multi-mode antenna 750 driven by an instruction or signal based on the SON algorithm for mode 1 can be compensated by an increase in the pilot power of the signal associated with mode 2. Conversely, an uptilt in the common multi-mode antenna 750 driven by an instruction or signal based on the SON algorithm for mode 1 can be compensated by a decrease in the pilot power of the signal associated with mode 2.

In some embodiments, the calculations for antenna-parameter modifications and/or non-antenna-parameter modifications can be performed at each mode-specific controller for the corresponding mode. For example, the calculations for non-antenna-parameter modifications for mode 1, 2 and 3 can be performed at the controller 742, 744 and 746, respectively. Alternatively, as shown and described with respect to FIGS. 1-3, calculations for modifications on antenna-parameters and/or non-antenna parameters associated with the multiple modes can be performed at a centralized location such as a network optimization device (e.g., implemented at a centralized controller not shown in FIG. 7) similar to the network optimization device 101, 200 or 300.

FIG. 8 is a flow chart illustrating a method 800 for coordinating optimization in a multi-mode network, according to an embodiment. The code representing instructions to perform method 800 can be stored in, for example, a non-transitory processor-readable medium (e.g., a memory) in a network optimization device that is similar to the network optimization device 101, 200 and 300 shown and described with respect to FIGS. 1-3. Particularly, the network optimization device can be included in a multi-mode wireless network similar to the multi-mode wireless network 100 shown and described with respect to FIG. 1. The multi-mode wireless network can be associated with a cellular network area. In some embodiments, the multi-mode wireless network is used to provide wireless communication coverage for the cellular network area. The code stored in the non-transitory processor-readable medium of the network optimization device can be executed by a processor of the network optimization device that is similar to the processor 220 and 320 in FIGS. 2 and 3. The code includes code to be executed by the processor to cause the network optimization device to operate the functions illustrated in FIG. 8 and described as follows.

At 802, the network optimization device can receive a performance indicator associated with a first mode from a set of modes. The set of modes can be associated with a cellular network area. In some embodiments, the set of modes can include various RATs operating in the same frequency band and/or different frequency bands, and/or specific RAT(s) operating in the same frequency band and/or different frequency bands. The performance indicator for the first mode can be associated with an optimization objective for the first mode. In some embodiments, the performance indicator can be, for example, a KPI. In some embodiments, the network optimization device can receive the performance indicator at, for example, a network optimization module (e.g., the network optimization module 222 in FIG. 2) or a SON implementation module (e.g., the SON implementation module 322 in FIG. 3).

At 804, the network optimization device can calculate a first metric value using the performance indicator associated with the first mode. Such a calculated first metric value can be associated with a first metric and an objective of the first mode. Particularly, the first metric value can be calculated in a method such that the resulted first metric value, when implemented at corresponding network device(s), can cause the performance of the first mode to satisfy (or substantially satisfy) the objective of the first mode. In some embodiments, the first metric can be, for example, an antenna-based metric (e.g., a tilt of an antenna) or a parameter-based metric (e.g., a power level of the first mode). Correspondingly, the first metric value can be an antenna-based metric value or a parameter-based metric value. In some embodiments, the objective of the first mode can be a SON objective. In some embodiments, the calculation can be operated at the network optimization module or the SON implementation module of the network optimization device as described above with respect to FIGS. 2 and 3.

At 806, the network optimization device can calculate a second metric value using the first metric value. Such a calculated second metric value can be associated with a second metric and an objective of a second mode from the set of modes. As a result, the second metric value can at least partially compensate for a change in a performance indicator associated with the second mode when the first metric value is implemented. Similar to the first metric value, the second metric can be an antenna-based metric value or a parameter-based metric value. In some embodiments, the objective of the second mode can be the same objective as or a different objective from the objective of the first mode. In some embodiments, the performance indicator associated with the second mode can be associated with an inter-modal relationship between the first mode and the second mode. In some embodiments, the calculation of the second metric value can be operated at, for example, a network optimization module (e.g., the network optimization module 224 in FIG. 2) or a performance compensation module (e.g., the performance compensation module 324 in FIG. 3) of the network optimization device.

At 808, the network optimization device can send a signal associated with the first metric value and a signal associated with the second metric value to, for example, at least one antenna module associated with the cellular network area (assume both the first metric value and the second metric value are antenna parameter values. As a result, the at least one antenna module can implement the first metric value and the second metric value. In some embodiments, the first metric value and the second metric value can be implemented at a single antenna. In some other embodiments, the first metric value and the second metric value can be implemented at different antennas.

While shown in FIGS. 2 and 3 as being included in the processor 220 of the network optimization device 200 or in the processor 320 of the network optimization device 300, in other embodiments, a network optimization module, a SON implementation module or a performance compensation module can communicate with any other device of the multi-mode wireless network via an application programming interface (API) of a network module and/or application, a network process, an intermediary device, and/or any other suitable means. Additionally, a network optimization device (e.g., the network optimization device 101 in FIG. 1) can receive network information and/or data (e.g., performance indicators, characteristic patterns) from a network database (e.g., the network database 120 in FIG. 1) or any other device in any suitable format such as, for example, text files, a file format associated with a network, and/or the like. Similarly, the network optimization device can send instructions of parameter changes to network elements in any suitable means.

While shown and described with respect to FIGS. 2 and 3 as two different designs of a network optimization device, in other embodiments, such two designs can be combined (or partially combined) in a network optimization device. For example, a network optimization device can include one or more SON implementation modules operating similarly as the network optimization modules in FIG. 2, as well as one or more performance compensation modules operating similarly as the performance compensation module in FIG. 3.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive a performance indicator associated with a first mode from a plurality of modes associated with a cellular network area;
   calculate, using the performance indicator associated with the first mode, a first metric value, the first metric value being associated with a first metric and an objective of the first mode;
   calculate, using the first metric value, a second metric value, the second metric value being associated with a second metric and an objective of a second mode from the plurality of modes, the second metric value at least partially compensating for a change in a performance indicator associated with the second mode when the first metric value is implemented; and
   send a signal associated with the first metric value and a signal associated with the second metric value to at least one antenna module associated with the cellular network area such that the at least one antenna module implements the first metric value and the second metric value.

2. The non-transitory processor-readable medium of claim 1, wherein the first mode includes a first Radio Access Technology (RAT) and the second mode includes a second RAT.

3. The non-transitory processor-readable medium of claim 1, wherein the first mode includes a Radio Access Technology (RAT) operating in a first frequency band, the second mode includes the RAT operating in a second frequency band different from the first frequency band.

4. The non-transitory processor-readable medium of claim 1, wherein the first metric is an antenna-based metric and the second metric is a parameter-based metric.

5. The non-transitory processor-readable medium of claim 1, wherein the objective of the first mode is a Self Optimizing Network (SON) objective, the objective of the second mode is the SON objective.

6. The non-transitory processor-readable medium of claim 1, wherein the objective of the first mode is different from the objective of the second mode.

7. The non-transitory processor-readable medium of claim 1, wherein the first metric value is associated with a tilt of an antenna, the second metric value is associated with a power level of the second mode.

8. The non-transitory processor-readable medium of claim 1, wherein the performance indicator associated with the second mode is associated with an inter-modal relationship between the first mode and the second mode.

9. The non-transitory processor-readable medium of claim 1, wherein the at least one antenna module is associated with a single antenna configured to implement the first mode and the second mode.

10. The non-transitory processor-readable medium of claim 1, wherein the at least one antenna module is associated with a first antenna configured to implement the first mode and a second antenna configured to implement the second mode.

11. An apparatus, comprising:
a first network optimization module implemented in at least one of a memory or a processing device, the first network optimization module associated with a first mode from a plurality of modes of a cellular network area, the first network optimization module configured to receive a performance indicator associated with the first mode, the first network optimization module configured to calculate, using the performance indicator associated with the first mode, a metric value associated with a first metric, the first network optimization module configured to calculate the metric value associated with the first metric that satisfies an objective of the first mode when the metric value associated with the first metric is implemented; and
a second network optimization module operatively coupled to the first network optimization module, the second network optimization module associated with a second mode from the plurality of modes, the second network optimization module configured to calculate, using the metric value associated with the first metric, a metric value associated with a second metric and the second mode, the second network optimization module configured to calculate the metric value associated with the second metric that reduces an effect on a performance indicator associated with the second mode after the metric value associated with the first metric is implemented,
the first network optimization module configured to send a signal associated with the metric value associated with the first metric to at least one antenna module associated with the cellular network area such that the at least one antenna module implements the metric value associated with the first metric,
the second network optimization module configured to send a signal associated with the metric value associated with the second metric to the at least one antenna module associated with the cellular network area such that the at least one antenna module implements the metric value associated with the second metric.

12. The apparatus of claim 11, wherein the first mode includes a first Radio Access Technology (RAT) and the second mode includes a second RAT.

13. The apparatus of claim 11, wherein the first mode includes a Radio Access Technology (RAT) operating in a first frequency band, the second mode includes the RAT operating in a second frequency band different from the first frequency band.

14. The apparatus of claim 11, wherein the metric value associated with the first metric is associated with a tilt of an antenna, the metric value associated with the second metric is associated with a power level of the second mode.

15. The apparatus of claim 11, wherein the performance indicator associated with the second mode is associated with an inter-modal relationship between the first mode and the second mode.

16. An apparatus, comprising:
a Self Optimizing Network (SON) implementation module implemented in at least one of a memory or a processing device, the SON implementation module configured to receive, at a first time, a value of a performance indicator associated with a first mode from a plurality of modes associated with a cellular network area and a value of a performance indicator associated with a second mode from the plurality of modes,
the SON implementation module configured to calculate a first metric value using the value of the performance indicator associated with the first mode at the first time, the first metric value affecting the performance indicator associated with the first mode and the performance indicator associated with the second mode when the first metric value is implemented; and
a performance compensation module operatively coupled to the SON implementation module, the performance compensation module configured to receive the first metric value from the SON implementation module, the performance compensation module configured to calculate, using the first metric value, a second metric value,
the SON implementation module configured to send a signal associated with the first metric value to at least one antenna module associated with the cellular network area such that the at least one antenna module implements the first metric value after the first time but prior to a second time,
the performance compensation module configured to send a signal associated with the second metric value to the at least one antenna module such that the at least one antenna module implements the second metric value after the first time but prior to the second time and such that a value of the performance indicator associated with the second mode at the second time is within a predetermined range of the value of the performance indicator associated with the second mode at the first time.

17. The apparatus of claim 16, wherein the first mode includes a first Radio Access Technology (RAT) and the second mode includes a second RAT.

18. The apparatus of claim 16, wherein the first mode includes a Radio Access Technology (RAT) operating in a first frequency band, the second mode includes the RAT operating in a second frequency band different from the first frequency band.

19. The apparatus of claim 16, wherein the first metric value is associated with an antenna-based metric and the second metric value is associated with a parameter-based metric.

20. The apparatus of claim 16, wherein the performance indicator associated with the second mode is associated with an inter-modal relationship between the first mode and the second mode.

* * * * *